United States Patent
Kumar et al.

(10) Patent No.: US 9,792,936 B1
(45) Date of Patent: Oct. 17, 2017

(54) GIMBAL ASSEMBLY WITH LINEAR ACTUATORS THAT CAUSE ROTATION OF A SLIDER

(71) Applicant: Seagate Technology LLC, Cupertino, CA (US)

(72) Inventors: Vijay Kumar, Edina, MN (US); Ravishankar Ajjanagadde Shivarama, Eden Prairie, MN (US); Taiho Yeom, St. Paul, MN (US); Razman Zambri, Eden Prairie, MN (US); Bradley Ver Meer, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/139,421

(22) Filed: Apr. 27, 2016

(51) Int. Cl.
 *G11B 5/48* (2006.01)
 *G11B 5/55* (2006.01)

(52) U.S. Cl.
 CPC ............ *G11B 5/483* (2015.09); *G11B 5/4833* (2013.01); *G11B 5/4853* (2013.01); *G11B 5/4873* (2013.01); *G11B 5/5552* (2013.01)

(58) Field of Classification Search
 CPC ..... G11B 5/483; G11B 5/4833; G11B 5/4873; G11B 5/4826; G11B 5/5552; G11B 5/4853; G11B 5/48
 See application file for complete search history.

(56) References Cited

U.S. PATENT DOCUMENTS

| | | | | |
|---|---|---|---|---|
| 6,055,132 | A * | 4/2000 | Arya | G11B 5/4826 360/245.9 |
| 6,069,771 | A | 5/2000 | Boutaghou et al. | |
| 6,376,964 | B1 * | 4/2002 | Young | G11B 5/5552 310/311 |
| 6,738,231 | B2 * | 5/2004 | Arya | G11B 5/56 360/245.3 |
| 7,006,333 | B1 * | 2/2006 | Summers | G11B 5/4826 360/245.7 |
| 7,068,473 | B2 * | 6/2006 | O'Neill | G11B 5/5552 360/294.4 |
| 7,298,593 | B2 | 11/2007 | Yao et al. | |
| 7,375,930 | B2 * | 5/2008 | Yang | G11B 5/5552 360/294.4 |
| 7,525,769 | B2 | 4/2009 | Yao et al. | |
| 8,085,508 | B2 * | 12/2011 | Hatch | G11B 5/4833 360/245.3 |
| 8,675,314 | B1 * | 3/2014 | Bjorstrom | G11B 5/482 360/245.3 |
| 8,699,186 | B1 * | 4/2014 | Hahn | G11B 5/4873 360/244.9 |

(Continued)

*Primary Examiner* — Brian Miller
(74) *Attorney, Agent, or Firm* — Hollingsworth Davis, LLC (57) ABSTRACT

A gimbal assembly includes a flex circuit with a first end extending along a loadbeam and second end having bond pads configured to be electrically coupled to a slider. The gimbal assembly includes a metallic layer with a fixed portion fixably attached to the loadbeam and a movable portion fixably attachable to the slider. The movable portion has at least one extension arm coupled to and providing support to the second end of the flex circuit. First and second linear actuators are coupled between the fixed portion and the movable portion. The first and second linear actuators cause a rotation of the slider in response to an electric signal.

17 Claims, 4 Drawing Sheets

(56) References Cited

U.S. PATENT DOCUMENTS

| | | | | |
|---|---|---|---|---|
| 8,797,690 B2* | 8/2014 | Tao | ................. | G11B 5/4826 |
| | | | | 360/234.6 |
| 8,861,143 B2* | 10/2014 | Hong | ................. | G11B 5/482 |
| | | | | 360/245 |
| 8,879,210 B1* | 11/2014 | Hahn | ................. | G11B 5/4873 |
| | | | | 360/245.3 |
| 8,964,334 B2* | 2/2015 | Takikawa | ............... | G11B 5/486 |
| | | | | 360/245.9 |
| 8,995,094 B1* | 3/2015 | Chen | ................. | G11B 5/4826 |
| | | | | 360/294.4 |
| 9,047,896 B1* | 6/2015 | Kudo | ................. | G11B 5/483 |
| 9,093,092 B1* | 7/2015 | Zhang | ................ | G11B 5/4873 |
| 9,117,466 B2* | 8/2015 | Takikawa | ............ | G11B 5/4833 |
| 9,218,834 B2* | 12/2015 | Imai | ................. | G11B 5/4833 |
| 9,406,314 B1* | 8/2016 | Hahn | ................. | G11B 5/4873 |
| 9,449,623 B2* | 9/2016 | Hagiya | ................ | H01L 41/042 |
| 2007/0253115 A1 | 11/2007 | Yao et al. | | |
| 2008/0144225 A1 | 6/2008 | Yao et al. | | |
| 2011/0096438 A1* | 4/2011 | Takada | ................ | G11B 5/4853 |
| | | | | 360/244.2 |
| 2013/0286801 A1* | 10/2013 | Shivarama | ............ | G11B 13/04 |
| | | | | 369/13.02 |
| 2014/0022675 A1* | 1/2014 | Hanya | ................. | G11B 5/483 |
| | | | | 360/244.5 |

\* cited by examiner

GIMBAL ASSEMBLY WITH LINEAR ACTUATORS THAT CAUSE ROTATION OF A SLIDER

SUMMARY

The present disclosure is directed to a gimbal assembly with linear actuators that cause rotation of a slider. In one embodiment, a gimbal assembly includes a flex circuit with a first end extending along a loadbeam and second end having bond pads configured to be electrically coupled to a slider. The gimbal assembly includes a metallic layer with a fixed portion fixably attached to the loadbeam and a movable portion fixably attachable to the slider. The movable portion has at least one extension arm coupled to and providing support to the second end of the flex circuit. First and second linear actuators are coupled between the fixed portion and the movable portion. The first and second linear actuators cause a rotation of the slider in response to an electric signal.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to magnetic hard disk drives. Generally, a servo controller of a hard disk drive drives a rotary actuator such as a voice coil motor (VCM) that positions a read/write head over the desired tracks of a magnetic recording medium, e.g., magnetic disk. Drives often contain two or more read/write heads that are held over different surfaces of one or more disks. All of the two or more read/heads may be commonly driven through large angular displacements by a voice coil motor (VCM). The VCM rotates a stack of arms upon which each read/write head is mounted. If the VCM makes coarse position adjustments, e.g., moving the heads between tracks. The position of each read/write head may also be independently controlled by a microactuator. A microactuator provides fine position control, e.g., maintaining position over the current track.

Microactuators can be mounted near the end of each arm and individually control the displacement of each head. The VCM and microactuator can provide respective coarse and fine adjustments of position. The microactuator in such a case can have a low, stroke, high-bandwidth response, which is useful for compensating for various types of disturbance, e.g., high-frequency disturbance. The microactuator may also be used during other conditions such as correcting for servo-fault, buzz conditions (e.g., rapidly energizing the microactuator to clear a fault condition), factory Bode sweeps, etc. The placement of the microactuator within the head gimbal assembly offers challenges in terms of design, performance and manufacturability.

Figure 1:
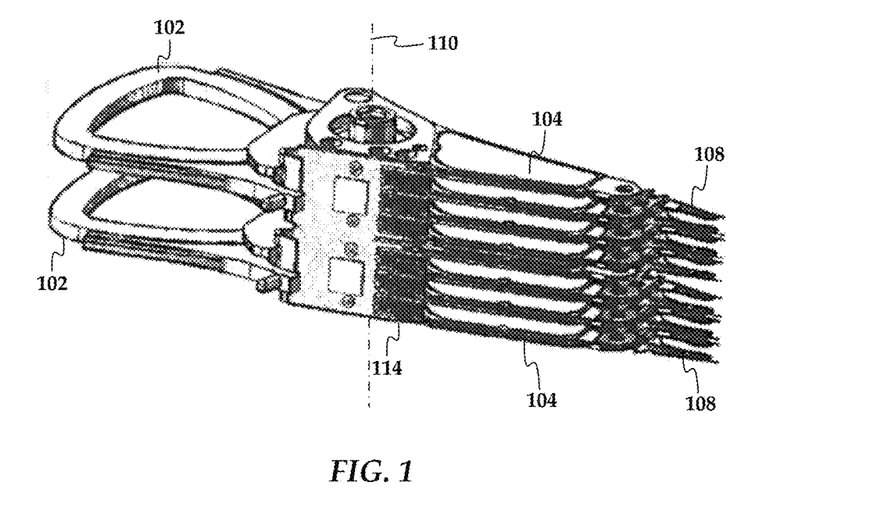
FIG. 1 is a perspective view of a head stack assembly according to an example embodiment.

In FIG. 1, a perspective views shows a head stack assembly 100 of a disk drive according to an example embodiment. The head stack assembly 100 includes coils 102 and a plurality of actuator arms 104. On each arm 104 are located respective microactuators 106 and head gimbal assemblies (HGAs) 108. The HGAs 108 each include a magnetic read/write head and suspension that suspends the read/write head over a magnetic disk. When assembled into the drive, the coils 102 are positioned between permanent magnets such that application of current to the coils 102 causes rotation of the arms 104 about an axis of rotation 110.

Rotation of the arms 104 causes the read/write heads to move to different tracks on the disk. For purposes of this disclosure, a centerline of the arms 104 extending from the axis of rotation 110 to the tips will be referred to as a downtrack direction. A direction normal to the downtrack direction in a plane of the arms 104 will be referred to as a crosstrack direction. Note that this terminology is used for purposes of convenience. During operation, these directions may not align with the actual downtrack and crosstrack directions on the disks, e.g., due to skew angle of the arms 104 relative to the disks.

Figure 2:
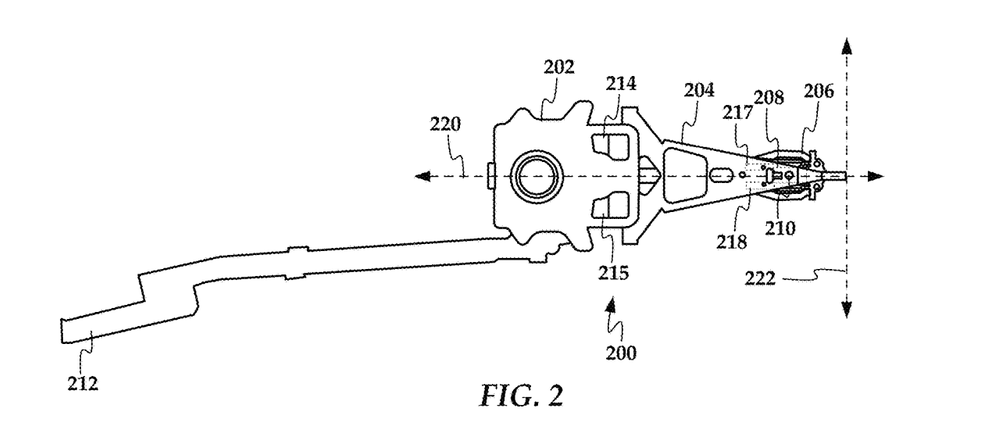
FIGS. 2 and 3 are top and bottom views of a gimbal assembly according to an example embodiment.

An HGA structure 200 according to an example embodiment is shown in the top view of FIG. 2. Note that lines 220, 222 in FIG. 2 represent respective downtrack and crosstrack directions discussed above and as used hereinbelow. A baseplate 202 connects a loadbeam 204 to the arm (not shown). The loadbeam 204 is coupled between the baseplate 202 and a gimbal assembly 206 upon which a read/write head 208 (also referred to herein as a slider) is mounted. The slider 208 faces away from the top surface in this view and is shown using dashed lines. The gimbal assembly 206 allows the slider 208 to gimbal about a dimple 210 on the loadbeam 204. The gimbal assembly 206 may include multiple layers, such as a layer of stainless steel, an insulation layer, and a layer containing copper traces that transmit electrical signals between the slider 208 and a flex circuit tail 212.

In some HGA structures, linear actuator elements (e.g., piezoelectric actuators) may be mounted at or near regions 214, 215 on the loadbeam 204 near the baseplate 202. The piezoelectric elements operate together as a microactuator to selectably induce cross-track displacement of the slider 208 in response to an electrical signal. The two piezoelectric elements may be identical to each other, with the exception of poling direction. For example, when a positive voltage is applied to both the elements one element expands, while the other element contracts, transmitting a linear force/displacement to the gimbal member. The gimbal members are designed to translate the linear displacement to a rotary motion of the slider. Reaction forces from this motion are transmitted to the arm via the loadbeam 204. In the examples below, linear actuator elements are described as being piezoelectric actuator elements, but the gimbal configurations shown herein may be used with any type of linear actuator elements (e.g., MEMS devices, electromagnetic actuators, thermal expansion members, etc.)

One of the challenges associated with such a microactuating mechanism located near the baseplate 202 is the transmission of reaction forces from the microactuator to the arm. These reaction forces could potentially excite undesirable resonances in the arm and hence degrade tracking performance. One way to minimize reaction forces due to microactuation involves ensuring that the read/write head undergoes a pure rotary motion about the dimple during microactuation.

To design such a rotary microactuation mechanism, the motor elements are placed close to the head area (collocated). For example, in the embodiment shown in FIG. 2, linear actuators, e.g., piezoelectric elements 217, 218 are mounted just behind the read/write head. The piezoelectric elements 217, 218 are attached to the gimbal such that the expansion and contraction of the elements 217, 218 provides a rotary motion for the head 208 about the dimple 210. As noted above, the piezoelectric elements 217, 218 may have opposite poling therefore one expands while the other contracts in response to the same activation signal. The position of the piezoelectric elements 217, 218 on the gimbal can influence the performance. The position of the piezoelectric elements 217, 218 may further be constrained by the presence of an additional laser unit attached to the read/write head for heat-assisted magnetic recording (HAMR) devices.

Figure 3:
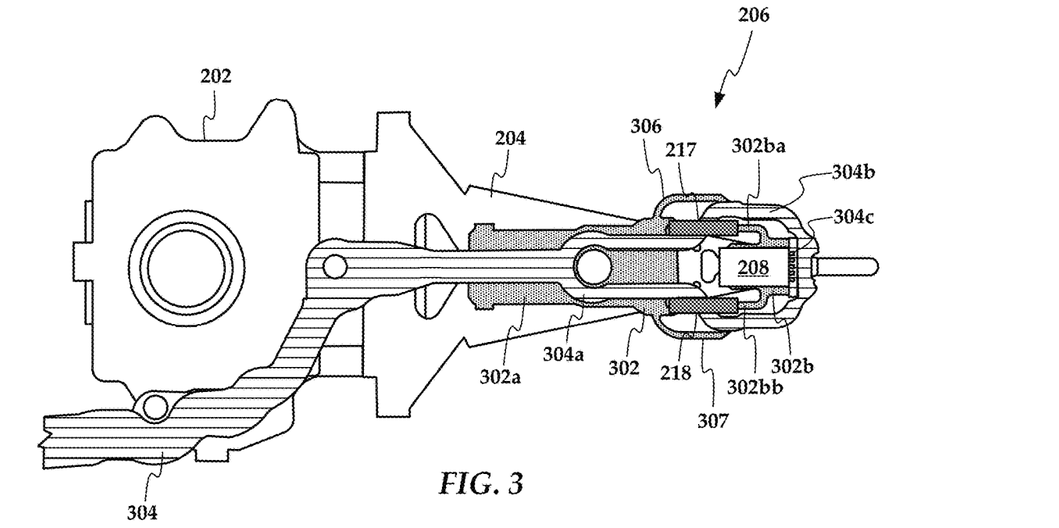

In FIG. 3, a close-up bottom view shows details of the collocated microactuator design of the gimbal assembly 206. This view shows surfaces of the components that face the recording medium. The gimbal assembly 206 includes a metallic layer 302 (shaded). The metallic layer 302 may be formed from stainless steel or other materials exhibiting similar properties. A flex circuit assembly 304 (horizontal hatching) includes a layer of insulation material and a layer containing copper traces to transmit electrical signals between the slider 208 and the tail. The flex circuit assembly has a first end 304a extending along the loadbeam and a second end 304b with bond pads 304c configured to be electrically coupled to a leading edge of the slider 208.

The metallic layer 302 has two portions, a fixed portion 302a and a movable/moving portion 302b. Generally, a fixed member and a movable member may be formed from the same piece (e.g., the metallic layer 302) or separate pieces that perform a similar function as the fixed and movable portions 302a-b. The fixed portion 302a is welded to the loadbeam 204 at specific locations. The movable portion 302b is fixably attached to the read/write head 208, e.g., via an adhesive. Flexible arms 306, 307 are coupled between the fixed portion 302a and the movable portion 302b. In this example, the flexible arms 306, 307 extend from mounting regions 302bc, 302bd at the ends of load carrying members 302ba, 302bb.

Figure 4:
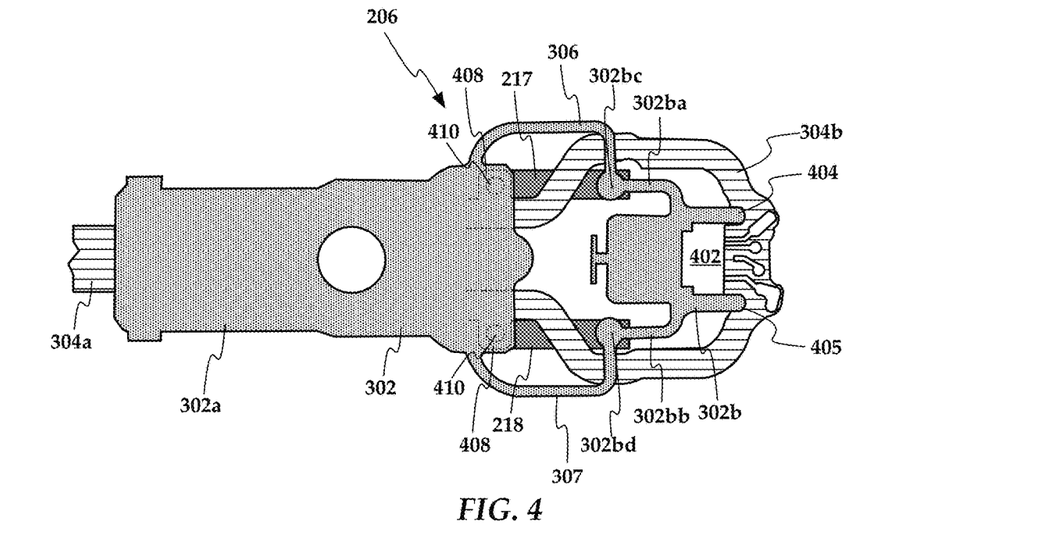
FIG. 4 is a top view showing details of the gimbal assembly of FIGS. 2 and 3.

In FIG. 4, a top view shows additional details of the gimbal assembly 206. First ends of the piezoelectric elements 217, 218 are mounted to the mounting regions 302bc, 302bd at the ends of load carrying members 302ba, 302bb. Opposite ends of the piezoelectric elements 217, 218 are mounted to the fixed portion 302a. The piezoelectric elements 217, 218 cause movement of the movable portion 302b through their respective contraction and extension. Note that the load carrying members 302ba, 302bb extend from a midpoint of the slider 208 in the downtrack direction. This ensures that forces applied to the movable portion 302b by the piezoelectric elements 217, 218 induce rotation of the slider 208 about the centrally located dimple.

Note that the piezoelectric elements 217, 218 are oriented parallel to the longitudinal axis of the suspension, which corresponds to a centerline of the arm that carries the suspension. The piezoelectric elements 217, 218 could be placed at an angle anywhere between parallel to the longitudinal axis of the suspension (e.g., the downtrack direction) to being parallel to the respective top and bottom edges of the loadbeam 204. Also note that the mounting points 302bc, 302bd overlap the slider 208 in the cross-track direction, although in other embodiments may be aligned with a trailing edge of the slider or located away from the trailing edge towards the baseplate 202.

The movable portion 302b of the metallic member has an opening 402 that allows a laser unit to be attached to the slider from the top side. Extension arms 404, 405 extend around this opening and overlap part of the flex circuit 304. The extension arms 404, 405 can be bonded to the flex circuit 304 to reduce stresses in bonds (e.g., solder joints, conductive adhesives) between a second end 304b of the flex circuit 304 and the slider 208.

In non-HAMR HGAs, the absence of a laser unit would allow the traces to be either routed through the area of the opening 402, providing a compact design in the head area even in the case of a collocated microactuator design. In non-HAMR other cases, a single extension arm may extend through this area for support of the end 304b of the flex circuit 304. For HAMR suspensions, because of the presence of the laser unit, the traces could not be routed in this area and hence, maintaining the same width for the suspension near the slider becomes challenging if both the piezoelectric elements 217, 218 and the traces need to be accommodated. To minimize this impact, the mounting points 302bc, 302bd can be moved towards the baseplate 202, such that they are either partially overlapping the slider 208 or fully behind the slider 208.

As noted above, the location and angle of the piezoelectric elements 217, 218 can be varied from what is shown in FIGS. 2-4. Each of these configurations may include different design features to achieve a rotary motion. For example, by changing the size/location of the mounting points 302bc, 302bd in the movable portion 302b and the attachment points on the fixed portion 302a of the metallic layer 302, full rotary motion (or substantially rotary motion) may be induced by activation of the piezoelectric elements 217, 218.

The piezoelectric elements 217, 218 may be attached to the movable portion 302b of the metallic layer 302 through a conductive adhesive. The metallic layer 302, which may be grounded, e.g., via an electrical ground pad of the slider, is the grounding surface for the piezoelectric elements 217, 218. The other end of the piezoelectric elements 217, 218 is attached to copper traces of the flex circuit 304 that transmit the electrical signals from the tail. For example, the flex circuit 304 may include extensions/tabs 408 with electrical contacts 410 that bond with ends of the piezoelectric elements 217, 218. In such a case, the flex circuit 304 is fixably attached to the fixed portion 302a at least in proximity to these contacts 410. The electrical connection between the piezoelectric elements 217, 218 and the copper traces may be established using a conductive adhesive.

In such HGAs, the assembly process may involve the placement of piezoelectric elements 217, 218 onto the metallic layer 302 and flex circuit 304 before assembling the loadbeam structure 204. The loadbeam assembly process may involve attaching (e.g., welding) the loadbeam structure 204 and the metallic structure 302 of the gimbal assembly 206. In some cases, this risks damage to the piezoelectric elements 217, 218. Furthermore, parts of the gimbal assembly (e.g., parts of the metallic layer 302) may deform in the vertical direction when actuated during operation. In some configurations, this could cause the piezoelectric elements 217, 218 to touch the disk/recording medium, which could lead to loss of data and/or head failure. Further, it is possible (and more likely) that media-facing piezoelectric elements 217, 218 can touch the disk during an operational shock event. In such a case, an alternate embodiment where the linear actuators face away from the disk may be used.

Figure 5:
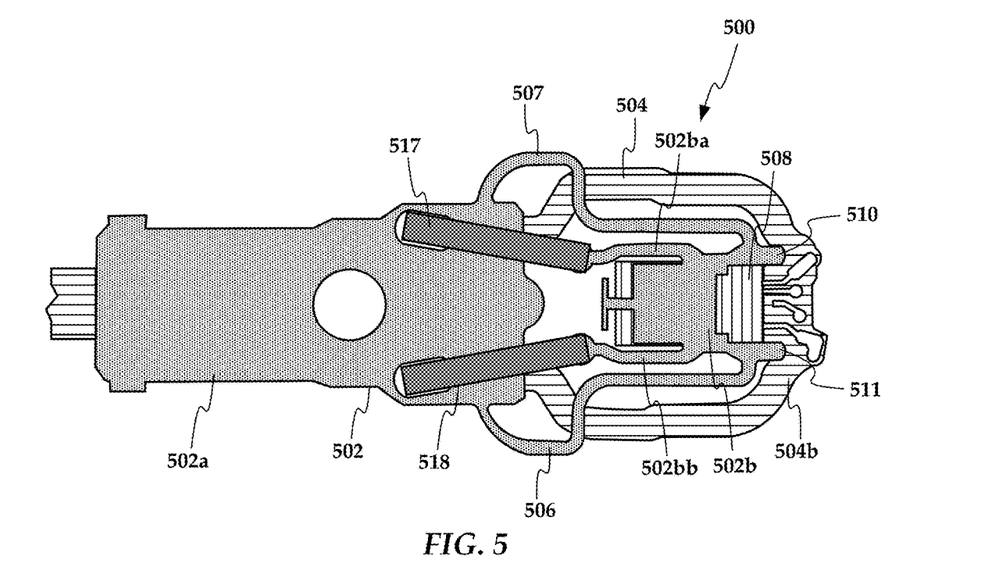
FIGS. 5 and 6 are top and perspective views of a gimbal assembly according to another example embodiment.
Figure 6:
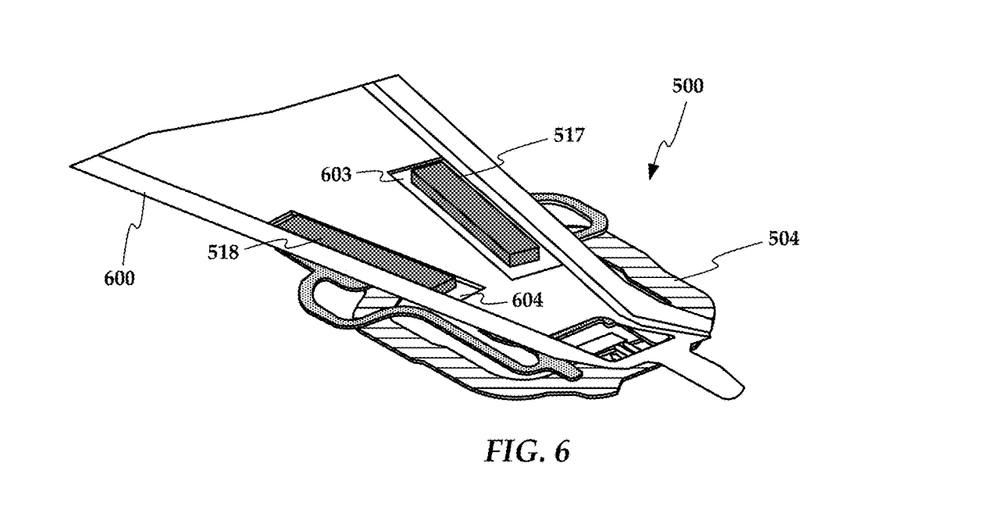

The diagrams in FIGS. 5 and 6 are respective top and perspective views of a gimbal assembly 500 according to another example embodiment. A metallic layer 502 includes fixed and movable portions 502a, 502b. Generally, a fixed member and a movable member may be formed from the same piece (e.g., the metallic layer 502) or separate pieces that perform a similar function as the illustrated fixed and movable portions 502a-b. The fixed portion 502a is coupled to a loadbeam 600 (see FIG. 6) and the movable portion 502b is coupled to a slider 508. Piezoelectric elements 517, 518 extend and retract to cause rotation of the movable portion 502b and slider 508. A flex circuit 504 provides electrical connectivity to the slider 508 and the piezoelectric elements 517, 518.

In this example, load carrying members 502ba, 502bb extend from the middle of the slider 508 to the piezoelectric elements 517, 518 where they terminate. Flexible arms 506, 507 extend from the fixed portion 502a to one or more extension arms 510, 511 at a leading edge of the movable portion 502b. This is in contrast to the embodiment shown, e.g., in FIG. 4, wherein flexible arms 306, 307 extend from an end of the load carrying members 302ba, 302bb, however such an arrangement could also be used for the embodiment in FIG. 5. Generally, the attachment point for the flexible arms can be chosen/designed based on the load carrying ability of the arm for each design and could be optimized per design requirements, e.g., desired stroke, available extension of the piezoelectric elements, etc. As with that previous example, the extension arms 510, 511 are coupled to and providing support to a second end 504b of the flex circuit 504.

As seen in FIG. 6, the piezoelectric elements 517, 518 in this embodiment are located on a side of the metallic layer 502 that faces the loadbeam 600 (see FIG. 6). The loadbeam 600 has clearance holes 603, 604 that are substantially larger than the piezoelectric elements 517, 518. The size and location of the clearance holes 603, 604 allow for the assembly tolerances and dimensional variation of piezoelectric elements 517, 518, and to allow for changes in position during operation. Placing the piezoelectric elements 517, 518 on this side, which faces away from the recording medium, reduces the risk that the piezoelectric elements 517, 518 may contact the recording medium, e.g., due to operational shock event.

Figure 7:
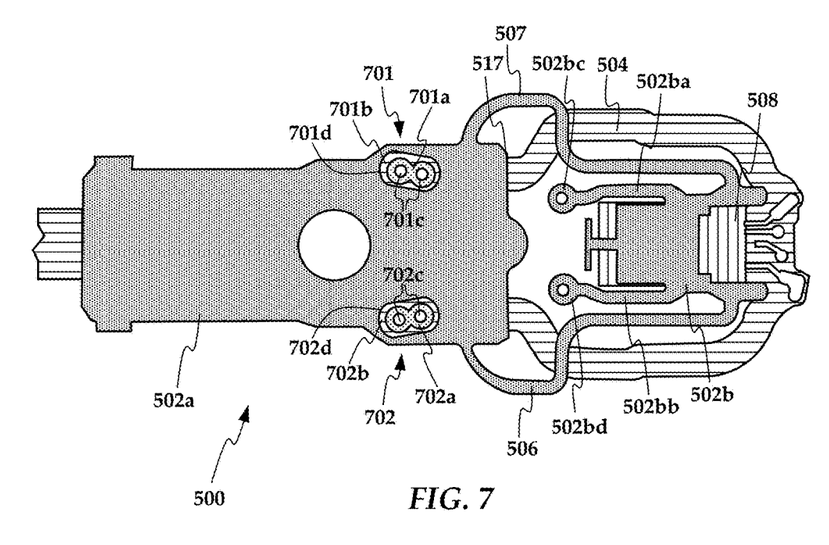
FIG. 7 is a top view of the gimbal assembly of FIG. 5 with the linear actuators removed.

In FIG. 7, a top view shows the gimbal assembly 500 as in FIG. 5 with the piezoelectric elements 517, 518 removed. The non-gimbaled, fixed portion 502a of the metallic layer includes attachment areas 701, 702 in the fixed portion 502a of the metallic layer 502. One end of the piezoelectric elements 517, 518 are electrically and mechanically coupled to the attachment areas 701, 702. Each of the attachment areas 701, 702 include conductive regions 701a, 702a supported by insulation material 701b, 702b. The conductive regions 701a, 702a may be formed integrally within the flex circuit 504, the flex circuit 504 being bonded to an opposite side of the fixed portion 502a proximate voids 701d, 702d through the fixed portion 502a.

Both the insulation material and the conductive regions have openings 701c, 702c through which a conductive adhesive on one side can be used to create an electrical connection between the conductive regions 701a, 702a and the piezoelectric elements 517, 518. Similar openings can be seen in mounting points 502bc, 502bd of the load bearing arms 502ba, 502bb. In this example the mounting points 502bc, 502bd are behind a trailing edge of the slider 508 in a downtrack direction. As will be discussed in detail below, the location of these mounting points 502bc, 502bd in the downtrack direction can affect the behavior/performance of the gimbal assembly 500.

These openings allow the piezoelectric elements 517, 518 to be assembled from the top side after the loadbeam 600 is assembled with the metallic layer 502. This can mitigate the risk of damage to the piezoelectric elements 517, 518 during further operation. Since the piezoelectric elements 517, 518 are located further away from the disk, this design provides an improved margin for operational shock tolerance. In addition, since the metallic layer 502 is located in between the piezoelectric elements 517, 518 and the recording medium, the metallic layer 502 provides an additional constraint in the vertical direction, can also provide improved performance during operational shock events.

Figure 8:
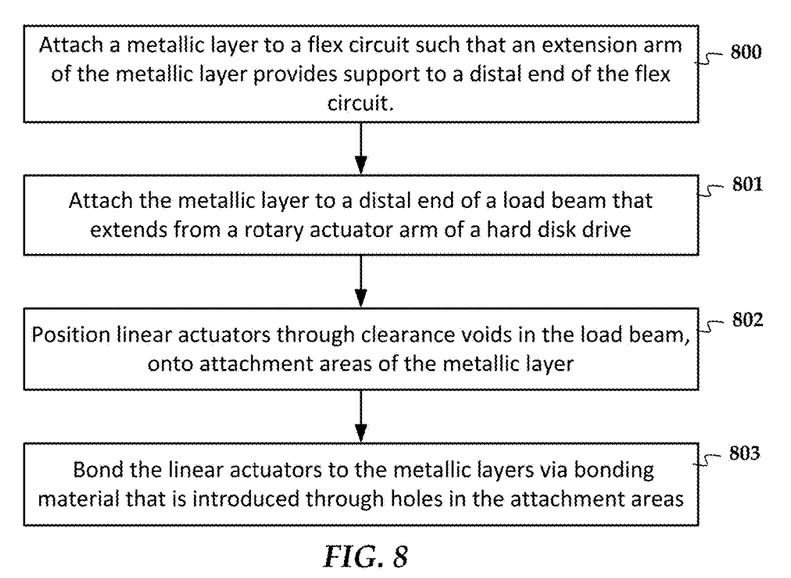
FIG. 8 is a flowchart of a method according to an example embodiment.

In FIG. 8, a flowchart shows a method according to an example embodiment. The method involves attaching 800 a metallic layer to a flex circuit such that at least one extension arm of the metallic layer is coupled to and provides support to a distal end of the flex circuit. The at least one extension arm extends from a movable member of the metallic layer, and the distal end of the flex circuit includes bond pads configured to be electrically coupled to a slider that is mounted on the movable portion.

The method further involves attaching 801 (e.g., welding) the metallic layer to a distal end of a loadbeam. The loadbeam extends from a rotary actuator arm of a hard disk drive. After the attachment 801, linear actuators are positioned 802, through clearance holes in the loadbeam, onto attachment areas on the metallic layer. First ends of the actuators are position over first attachment areas of the movable member of the metallic layer and second ends of the actuators are positioned over second attachment areas of a fixed member of the metallic layer. The second attachment areas include an electrical contact that is electrically isolated from the metallic layer (e.g., may be parts of the flex circuit that are accessible via holes in the fixed member). The first and second ends of the linear actuators are then bonded 804 to the metallic layers via bonding material that is introduced through holes in the first and second attachment areas.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A gimbal assembly, comprising:
   a flex circuit comprising first end extending along a loadbeam and second end comprising bond pads configured to be electrically coupled to a slider;
   a metallic layer comprising:
      a fixed portion fixably attached to the loadbeam, the fixed portion comprising first and second attachment areas each having a void;
      a movable portion fixably attachable to the slider, the movable portion comprising at least one extension arm coupled to and providing support to the second end of the flex circuit; and
   first and second linear actuators attached to a surface of the metallic layer that faces away from a recording medium and causing a rotation of the slider in response to an electric signal, wherein the loadbeam comprises clearance holes that accommodate the first and second actuator elements, the first and second linear actuators each comprising:

first ends coupled to the attachment areas of the fixed portion, wherein the voids of the attachment areas facilitate applying conductive adhesive to the ends of the first and second linear actuators after positioning of the loadbeam over the fixed portion; and second ends coupled to mounting points of the movable portion.

2. The gimbal assembly of claim 1, wherein the movable portion comprises mounting points between the movable portion to the first and second linear actuators, the mounting points overlapping the slider in a crosstrack direction.

3. The gimbal assembly of claim 2, further comprising first and second flexible members coupling the fixed portion to the mounting points of the movable portion.

4. The gimbal assembly of claim 1, wherein the movable portion comprises mounting points between the movable portion to the first and second linear actuators, the mounting points behind the slider in a downtrack direction.

5. The gimbal assembly of claim 4, further comprising first and second flexible members coupling the fixed portion to the at least one extension arm of the movable portion.

6. The gimbal assembly of claim 1, wherein the at least one extension arm comprises two extension arms, and wherein the movable portion comprises an opening between the two extension arms and proximate the bond pads of the flex circuit, the opening allowing a laser diode unit mounted to a top surface of the slider to extend through the movable portion when the slider is attached to the movable portion.

7. The gimbal assembly of claim 1, wherein the mounting points of the movable portion have second voids that facilitate applying the conductive adhesive to second ends of the first and second linear actuators after assembly of the loadbeam over the movable portion.

8. The gimbal assembly of claim 1, wherein the first and second linear actuators are parallel to each other.

9. The gimbal assembly of claim 1, wherein the first and second linear actuators cause the rotation of the slider about a dimple that is centrally located over the slider.

10. A gimbal assembly, comprising:

a flex circuit comprising first end extending along a loadbeam in a longitudinal direction and second end comprising bond pads configured to be electrically coupled to a slider;

a fixed member fixably attached to the loadbeam and comprising first and second attachment areas;

a movable member fixably attachable to the slider, the movable member comprising:
an extension arm coupled to and providing support to the second end of the flex circuit;
first and second load carrying members each having mounting points overlapping the slider or aligned with a trailing edge of the slider; and
first and second mounting points each having a void; and first and second linear actuators on a side of the fixed member that faces away from a recording medium, the first and second linear actuators causing a rotation of the slider in response to an electric signal, the first and second linear actuators each comprising:
first ends coupled to the attachment areas of the fixed member; and
second ends coupled to the mounting points of the movable member, wherein
the voids of the movable member facilitate applying conductive adhesive to second ends of the first and second linear actuators after assembly of the loadbeam over the movable portion.

11. The gimbal assembly of claim 10, wherein the movable member comprises an opening proximate the bond pads of the flex circuit, the opening allowing a laser diode unit mounted to a top surface of the slider to extend through the movable member when the slider is attached to the movable member.

12. The gimbal assembly of claim 10, wherein the first and second linear actuators are parallel to each other.

13. The gimbal assembly of claim 10, wherein the first ends of the first and second linear actuators coupled to the fixed member are coupled to contacts of the flex circuit, the flex circuit being flexibly attached to the fixed member at least in proximity to the contacts.

14. The gimbal assembly of claim 10, wherein the attachment areas comprise second voids that facilitate applying the conductive adhesive to the first ends of the first and second linear after positioning of the loadbeam over the fixed portion.

15. An apparatus, comprising:

a loadbeam attachable to a distal end of a rotary actuator arm, the loadbeam comprising first and second clearance holes;

a flex circuit comprising first end extending along the loadbeam and second end comprising bond pads configured to be electrically coupled to a slider;

a fixed member fixably attached to the loadbeam and comprising first and second attachment areas each having a void;

a movable member fixably attachable to the slider, the movable member comprising:
at least one extension arm coupled to and providing support to the second end of the flex circuit;
first and second load carrying members each having mounting points behind a trailing edge of the slider; and
first and second mounting points each having a second void; and first and second linear actuators located on a side of the fixed member that faces away from a recording medium and within the first and second clearance holes of the loadbeam, the first and second linear actuators causing a rotation of the slider in response to an electric current, the first and second linear actuators each comprising:
first ends coupled to the attachment areas of the fixed member; and
second ends coupled to the mounting points of the movable member, wherein the first and second voids of the attachment area and the mounting points facilitate applying conductive adhesive to the respective first second ends of the first and second linear actuators after assembly of the loadbeam over the fixed member and the movable member.

16. The apparatus of claim 15, further comprising first and second flexible members coupled between the fixed member and a leading edge of the movable member.

17. The apparatus of claim 15, wherein the at least one extension arm comprises two extension arms, and wherein the movable portion comprises an opening between the two extension arms and proximate the bond pads of the flex circuit, the opening allowing a laser diode unit mounted to a top surface of the slider to extend through the movable member when the slider is attached to the movable portion.

\* \* \* \* \*